(12) United States Patent
Leblond et al.

(10) Patent No.: US 7,453,923 B2
(45) Date of Patent: Nov. 18, 2008

(54) INTERFERENCE SUPPRESSION, METHOD AND DEVICE, IN RECEPTION, FOR A WIDEBAND RADIO SIGNAL

(75) Inventors: Valéry Leblond, Valence (FR); Alain Renard, Chabeuil (FR); Franck Letestu, Bourg-de-Peage (FR)

(73) Assignee: Thales (FR)

( * ) Notice: Subject to any disclaimer, the term of this patent is extended or adjusted under 35 U.S.C. 154(b) by 791 days.

(21) Appl. No.: 10/487,068

(22) PCT Filed: Sep. 3, 2002

(86) PCT No.: PCT/FR02/03001

§ 371 (c)(1),
(2), (4) Date: Feb. 19, 2004

(87) PCT Pub. No.: WO03/023445

PCT Pub. Date: Mar. 20, 2003

(65) Prior Publication Data

US 2004/0234016 A1 Nov. 25, 2004

(30) Foreign Application Priority Data

Sep. 7, 2001 (FR) .................................. 01 11616

(51) Int. Cl.
*H04B 1/69* (2006.01)
*H03K 5/159* (2006.01)

(52) U.S. Cl. ...................................... 375/148; 375/230
(58) Field of Classification Search .................. 375/144, 375/148, 316, 229, 230; 342/16; 398/39
See application file for complete search history.

(56) References Cited

U.S. PATENT DOCUMENTS

| 5,781,152 | A | 7/1998 | Renard et al. |
| 5,822,376 | A | 10/1998 | Renard |
| 5,850,420 | A | 12/1998 | Guillard et al. |
| 6,081,691 | A | 6/2000 | Renard et al. |
| 6,141,371 | A | 10/2000 | Holmes et al. |
| 6,317,078 | B1 | 11/2001 | Renard et al. |
| 6,345,177 | B1 | 2/2002 | Renard et al. |

FOREIGN PATENT DOCUMENTS

DE 42 23 676 A 1/1994

*Primary Examiner*—Khai Tran
(74) *Attorney, Agent, or Firm*—Lowe Hauptman Ham & Berner, LLP

(57) ABSTRACT

Apparatus and methods degarble a received broadband radio signal using spatial filtering. The apparatus and methods use various garbled versions of the signal delivered by parallel processing chains assumed to have the same transfer function. Automatic equalization (4d), at the level of the outputs of the processing chains (2a to 2g), is performed before the spatial filtering (3). The automatic equalization reduces disparities, innate or originate from drifts over time, between processing chains (2a to 2g), and uses a local test signal generator (5).

42 Claims, 9 Drawing Sheets

INTERFERENCE SUPPRESSION, METHOD AND DEVICE, IN RECEPTION, FOR A WIDEBAND RADIO SIGNAL

CROSS-REFERENCE TO RELATED APPLICATIONS

The present application is based on International Application No. PCT/FRO2/03001, filed on Sep. 3, 2002, which in turn corresponds to French Application No. 01 11616, filed on Sep. 7, 2001, and priority is hereby claimed under 35 USC §119 based on these applications. Each of these applications are hereby incorporated by reference in their entirety into the present application.

FIELD OF THE INVENTION

The present invention relates to the antigarbling, in reception, of a broadband radio signal by a spatial filtering taking account of various deformed versions of the signal that are delivered by parallel processing chains, such as for example, the individual processing chains associated with the radiating elements of a receive array antenna.

BACKGROUND OF THE INVENTION

Certain radio systems such as, for example, the so-called "GPS" (standing for "Global Positioning System") satellite navigation system use spread spectrum, hence broadband, radio signals received with a very low power level, easily, from 30 dB to 40 dB below the level of thermal noise at the input of a receiver. In a favourable environment, that is to say one which is not very noisy, the despreading operation enables the signal-to-noise ratio of the signal received to be raised well above 0 dB.Hz, so that the signals received may be utilized safely.

SUMMARY OF THE INVENTION

The technique of spread band transmission is relatively insensitive to intentional jamming when the frequency band used is not known to one seeking to jam since this frequency band is difficult to tag in view of the low power density per hertz of band of the signal transmitted. On the other hand, this is no longer the case when the frequency band or bands used are prescribed. It is in fact easy to disturb the reception of a spread band transmission signal by drowning it in broadband jamming. Specifically, by transmitting throughout the band occupied by the useful signal, noise exhibiting a power density per hertz that is appreciably greater than that of the useful signal it is possible to degrade the signal-to-noise ratio at the input of the receiver and this degradation propagates along the signal processing chain. The latter then only has to reduce the signal-to-noise level below a few dB.Hz after despreading in order for the useful signal to become difficult to utilize.

In the case of GPS, the frequency bands used are well known and the power of the signals received is low originating as they do from transmitters of a few tens of watts stored on board satellites orbiting the terrestrial globe at a distance of some twenty thousand kilometres from its surface. These two characteristics of prescribed transmission frequency bands and of low transmission powers render the reception of GPS signals particularly sensitive to broadband jamming since, in order to disturb the reception of GPS signals, one only has to locally employ a transmitter of noise occupying the GPS frequency bands, in the relevant zone, either on the ground, or above the ground onboard an aircraft: airplane, missile or the like. Hence, GPS jamming equipment capable, with a relatively low power being as it is of the order of four watts, of disturbing the reception of GPS signals in a very extended zone of up to 200 km in radius has appeared on the market since 1997.

To render GPS receivers less vulnerable to broadband jamming, various measures have been proposed. The main ones exploit the fact that the transmitters of useful signals, which navigation satellites are, and the jammers do not occupy the same geographical locations. They act on the radiation pattern of the antenna of the receiver to favour reception in the directions from which the useful signals transmitted by the navigation satellites originate to the detriment of reception in the directions of the jamming signals.

A first known measure consists in using in reception, an antenna with a skyward directed hemispherical radiation pattern that excludes the directions with a low angle of elevation. Such an antenna is often of array type, with several radiating elements placed, on an earth plane, at the vertices of a regular polygon and possibly a central radiating element, and with a spatial combiner that produces a weighted sum, in amplitude and in phase, of the signals picked up individually by the various radiating elements of the antenna so as to obtain a reception pathway corresponding to the desired radiation pattern.

A second measure complementary to the first, consists, since one is in the presence of an array type receive antenna, in implementing the technique of dynamic reduction of the power of the garbling signals by cancellation of the side lobes, a technique known by the abbreviation CSLC standing for "Coherent Side Lobe Cancellation".

This CSLC antigarbling technique was originally developed within the radar sphere. It consists in forming, dynamically, from the signals picked up by several radiating elements, a reception pathway corresponding to a radiation pattern exhibiting one or more lobes in the directions of the useful signals and holes in the directions of the jammers. Its implementation involves the following main steps:

static formation of several independent reception pathways on the basis of the signals picked up by the radiating elements used for reception, the independence between reception pathways signifying that none of them reduces to a simple linear combination of the others, election from among the reception pathways formed, of a main reception pathway, the others being regarded as auxiliary, and dynamic formation of a so-called "degarbled" reception pathway by adding, to the signal of the main reception pathway, a linear combination of the signals of the auxiliary reception pathways weighted in amplitude and in phase with the aid of dynamically adjusted coefficients so that the signals of the so-called "degarbled" reception pathway and of the auxiliary reception pathways are decorrelated.

It is shown that the possible number of independent reception pathways is less than or equal to that of the distinct radiating elements of the receiver antenna and that, in order to be able to eliminate N jammers, there must be at least N independent auxiliary reception pathways and hence an array antenna comprising at least N+1 distinct radiating elements must be available for reception.

The efficiency of this CSLC antigarbling technique depends on the precision and accuracy of determination of the amplitude- and phase-weighting coefficients used to add the signals of the auxiliary reception pathways to the signal of the main reception pathway. Without particular precautions, the use of this CSLC antigarbling technique within the sphere of receivers of signals transmitted in spread band mode such as GPS receivers, makes it possible to decrease, by some thirty dB, their sensitivity to broadband jamming.

One of the reasons advanced for the lack of accuracy of mechanisms for determining the amplitude- and phase-weighting coefficients used to add, to the signal of the main reception pathway, the signals of the auxiliary reception pathways within the framework of the CSLC antigarbling technique is the disturbing of these determining mechanisms by narrowband jamming that does not necessarily stem from hostile intention but from the ever greater congestion of the radio spectrum and gets superimposed on broadband jamming.

It has been proposed to remedy same by employing, at the level of each of the main and auxiliary reception pathways, before the dynamic formation of the "degarbled" reception pathway, narrowband rejection filters whose centre frequencies are adjusted adaptively to those of narrowband jamming signals which are manifested by spikes that overshoot the noise level in the useful band.

In fact, other possible reasons exist, including the fact that the mechanisms for determining the amplitude- and phase-weighting coefficients employ methods of determination based implicitly on identity of the transfer functions of the processing chains encountered in the various reception pathways whereas the analogue nature of the input stages of the processing chains enables this identity of transfer functions to be approximated only imperfectly, with discrepancies varying disparately over time.

Specifically, the transmission frequency span of most radio signals, this being the case for signals from GPS positioning satellites, is too high to lend itself directly to digital processing. The radio signal picked up must then undergo, in head-end analogue stages, rejection of the noise out of band and a drop in frequency, to a lower frequency span, intermediate frequency band or baseband, more accessible to the current technology of analogue/digital converters. This analogue nature of the input stages of the processing chains and the extended frequency range to be passed for the processing of a spread band signal make it impossible, even starting from an identical design, to succeed in giving two distinct processing chains exactly the same transfer function. Thus, undesired discrepancies of amplitude and of phase dependent on the frequency considered, which, moreover, change in disparate and random ways over time, always exist between the transfer functions of the various chains. These inevitable changing discrepancies unfavourably influence the precision and accuracy of the determination of the amplitude- and phase-weighting coefficients and therefore the efficiency of the degarbling.

An aim of the present invention is to improve the efficiency of the CSLC antigarbling technique within the framework of useful broadband signals. Its aim is, more generally, to improve the efficiency of all the broadband signal processing taking account of various versions of one and the same signal originating from parallel processing chains assumed to have identical transfer functions.

Its subject is a process of antigarbling, in reception, of a useful radio signal, by a spatial filtering taking into account various garbled versions of the signal that are delivered by a set of parallel processing chains assumed to have identical transfer functions, which is noteworthy in that it consists in carrying out an equalization, at the levels of the processing chains, before the spatial filtering, by individually equipping processing chains with adjustable temporal equalization filters and with equalization filter tailoring circuits operating on the basis of the differences noted between two versions of one and the same test signal produced locally, in reception, by a test signal generator, one of the versions traversing the equalized processing chain and the other serving as reference.

Advantageously, the test signal is distinguished from the useful signal by its appreciably greater power which relays the useful signal at the level of environmental noise.

Advantageously, the test signal is distinguished from the useful signal by an auxiliary modulation.

Advantageously, the test signal is distinguished from the useful signal by an auxiliary modulation by a pseudorandom binary string, the test signal being added to the useful signal in its modulated form during its passage through a processing chain and then separated from the useful signal by demodulation before being used by an equalization filter tailoring circuit.

Advantageously, an equalization filter tailoring circuit uses the version of the test signal that has traversed the processing chain to be equalized to measure, explicitly, the transfer function of this processing chain to be equalized, compares this transfer function with a reference transfer function derived from the reference version of the test signal and deduces from the differences noted tailoring values making it possible to attenuate these differences for an equalization filter inserted following the processing chain to be equalized.

Advantageously, an equalization filter tailoring circuit operates in an autoadaptive manner, so as to maximize the value of correlation between the two versions of the test signal, the reference version and that which has passed through the processing chain to be equalized, inclusive of the equalization filter.

Advantageously, the test signal generator provides two versions of the test signal, one in the input frequency band of the processing chains, the other in the output frequency band of the processing chains.

Advantageously, the reference version of the test signal is provided by one of the processing chains, the so-called main processing chain, which is devoid of any adjustable equalization filter and of any equalization filter tailoring circuit, and whose effective transfer function is taken as reference transfer function, whereas all the other processing chains, the so-called auxiliary processing chains, are provided individually with an adjustable equalization filter and with an equalization filter tailoring circuit.

Advantageously, all the processing chains are provided individually with an adjustable equalization filter and with an equalization filter tailoring circuit, the reference version of the test signal being taken equal to a weighted linear combination of the versions of the test signal that are transmitted by the various processing chains and are tapped off upstream of the adjustable equalization filters.

Advantageously, the tailoring of an equalization filter is done in the course of calibration periods during which the useful signal is replaced at the input of the processing chain considered by the test signal.

Advantageously, time slots are reserved for the calibration periods which are simultaneous for the various processing chains, the degarbling spatial filtering being interrupted during these time slots.

Advantageously, the calibration periods assigned to the various processing chains are not simultaneous but follow one another in succession, the processing chain under test being provisionally discarded from the spatial filtering.

Advantageously, the test signal is a spread band signal which occupies the same frequency band as the useful radio signal and which is obtained by modulation of a carrier with a specific pseudorandom binary string.

Advantageously, the test signal is a pure frequency line scanning the frequency band of the useful radio signal.

Advantageously, in the case of parallel processing chains corresponding to reception pathways originating from a receive array antenna with several radiating elements, the test signal is injected into the various processing chains, at the output of the receive array antenna, by means of multiplexing devices making it possible to link the inputs of the processing chains either to the receive antenna, or to the test signal generator.

Advantageously, the tailoring of the equalization filters of the processing chains is done continuously, in the background of the reception of the useful signal, by means of the test signal which is added to the useful signal at the input of the processing chains by way of a bank of couplers.

Advantageously, the tailoring of the equalization filters of the processing chains is done continuously, in the background of the reception of the useful signal, by means of the test signal which is modulated by an auxiliary modulation with the aid of a pseudorandom binary string, which is added to the useful signal at the input of the processing chains by means of a bank of couplers and which is separated from the useful signal by demodulation at the output of the processing chains.

The subject of the invention is also a device for antigarbling, in reception, of a useful radio signal operating by spatial filtering and implementing the aforesaid process.

Other characteristics and advantages of the invention will become apparent from the description, hereinbelow, of an embodiment given by way of example. This description will be given in conjunction with the drawing illustrating, diagrammatically, various examples of devices for antigarbling by spatial filtering mounted following a multielement reception antenna having several reception pathways and furnished, in accordance with the invention, with adjustable equalization filters interposed at the output of the processing chains of the reception pathways, upstream of the antigarbling spatial filter, and with circuits for tailoring the equalization filters operating with the aid of a test signal produced locally.

BRIEF DESCRIPTION OF THE DRAWINGS

More precisely, the drawing comprises:

a FIG. 1 showing an example in which the circuits for tailoring the equalization filters operate, in the course of calibration periods, by spectral analyses of a test signal version tapped off at the output of the measurement chain, upstream of the adjustable equalization filter, and of a test signal reference version provided directly by the local generator producing the test signal applied to the input of the processing chains, a FIG. 2 showing an example in which the circuits for tailoring the equalization filters operate, in the course of calibration periods, adaptively, on the basis of a correlation between a test signal version tapped off at the output of a measurement chain, downstream of the equalization filter, and of a test signal reference version provided directly by the local generator producing the test signal applied to the input of the measurement chain, a FIG. 3 showing an example in which the circuits for tailoring the equalization filters operate, in the course of calibration periods, by spectral analyses of a test signal version tapped off at the output of the measurement chain, upstream of the adjustable equalization filter, and of a test signal reference version tapped off at the output of a measurement chain devoid of any adjustable equalization filter, a FIG. 4 showing an example in which the circuits for tailoring the equalization filters operate, in the course of calibration periods, adaptively, on the basis of a correlation between a test signal version tapped off at the output of the measurement chain, downstream of the equalization filter, and of a test signal reference version tapped off at the output of a measurement chain devoid of any adjustable equalization filter, a FIG. 5 showing an example in which the circuits for tailoring the equalization filters operate, in the background of the reception of the useful signal, by means of the test signal which is added to the useful signal at the input of the processing chains by way of a bank of couplers adaptively, on the basis of a correlation between a test signal version tapped off at the output of the measurement chain, downstream of the equalization filter, and of a test signal reference version provided directly by the local generator producing the test signal applied at the input of the measurement chain, a FIG. 6 showing an example in which the circuits for tailoring the equalization filters operate, in the background of the reception of the useful signal, by means of the test signal which, after having undergone an auxiliary modulation, is added to the useful signal at the input of the processing chains by means of a bank of couplers, by spectral analyses of a test signal version tapped off at the output of the measurement chain, upstream of the adjustable equalization filter, and separated from the useful signal by demodulation, and of a test signal reference version provided directly by the local generator producing the test signal applied at the input of the processing chains, a FIG. 7 showing an example in which the circuits for tailoring the equalization filters operate, in the background of the reception of the useful signal, by means of the test signal which, after having undergone an auxiliary modulation, is added to the useful signal at the input of the processing chains by means of a bank of couplers, by spectral analyses of a test signal version tapped off at the output of the measurement chain, upstream of the adjustable equalization filter, and separated from the useful signal by demodulation, and of a test signal reference version tapped off at the output of a measurement chain devoid of any adjustable equalization filter, a FIG. 8 showing an example in which the circuits for tailoring the equalization filters operate, in the background of the reception of the useful signal, by means of the test signal which, after having undergone an auxiliary modulation, is added to the useful signal at the input of the processing chains by way of a bank of couplers, adaptively, on the basis of a correlation between two versions of the test signal that are separated from the useful signal by demodulation and are tapped off, one at the output of a measurement chain to be equalized, downstream of the equalization filter, and the other at the output of a measurement chain devoid of any adjustable equalization filter, and a FIG. 9 showing an example in which the circuits for tailoring the equalization filters operate, in the background of the reception of the useful signal, by means of the test signal which, after having undergone an auxiliary modulation, is added to the useful signal directly at the input of each sensor by means of the radiation of the central element and by directional coupling with the latter, adaptively, on the basis of a correlation between two versions of the test signal that are separated from the useful signal by demodulation and are tapped off, one at the output of a measurement chain to be equalized, downstream of the equalization filter, and the other at the output of a measurement chain devoid of any adjustable equalization filter.

DETAILED DESCRIPTION OF THE DRAWINGS

In the various figures, the unchanged elements retain the same indexations.

Figure 1:
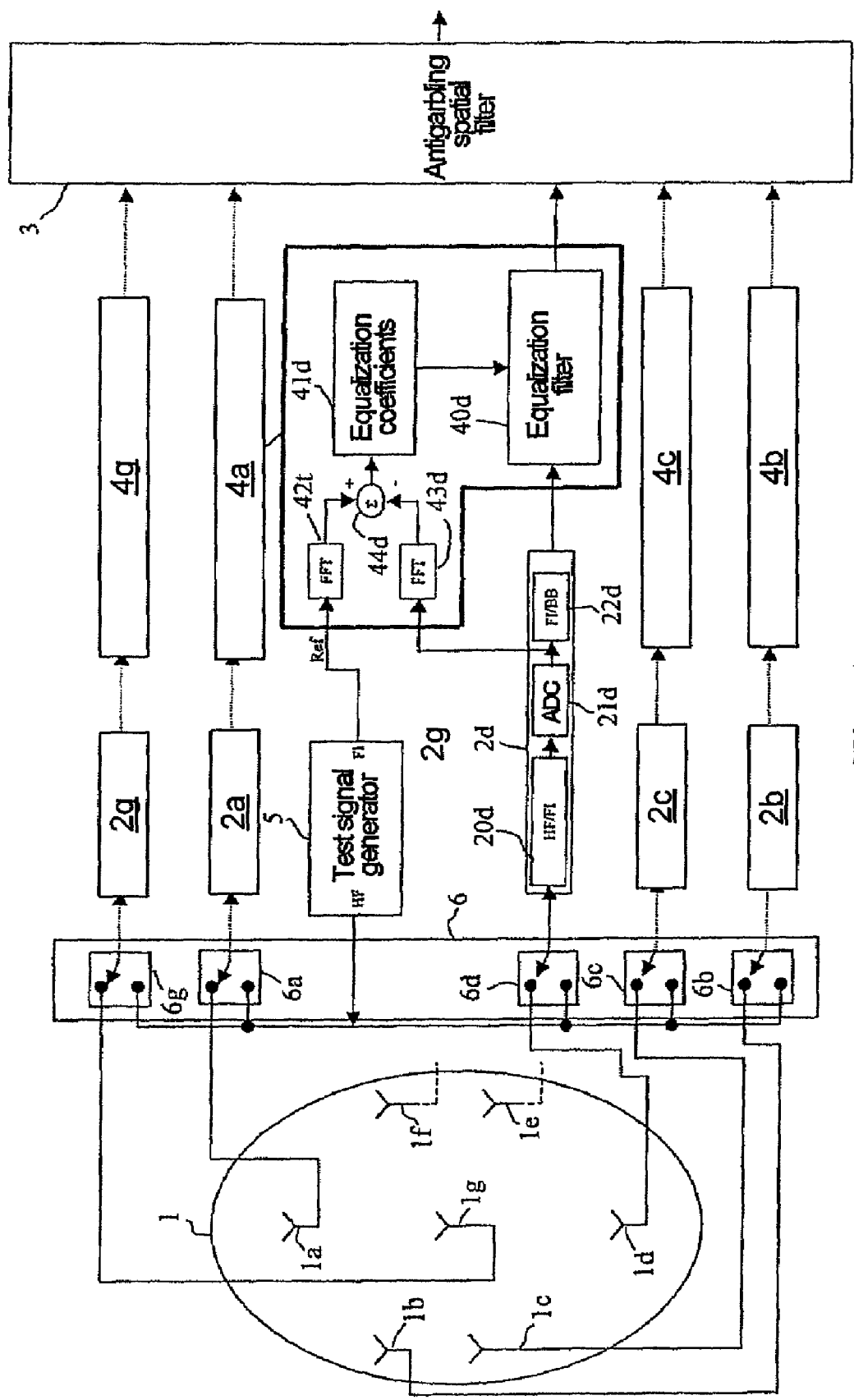

The device for antigarbling by spatial filtering illustrated in FIG. 1 is assumed to process in reception, radio signals originating from the navigation satellites of the GPS system. It is placed at the level of the input stages of a GPS receiver, following the receive antenna 1, in front of the stages devoted to the despreading of the GPS signals, to the extraction of the information contained in the despread signals and to the calculations of position and of speed on the basis of the extracted information.

The receive antenna 1 is an array antenna with upward directed hemispherical radiation pattern so as to make it possible to pick up signals originating from transmitters stowed onboard nongeostationary satellites. It is configured so as to have a skyward sensitivity limited to angles of elevation greater than a few degrees so as to be influenced as little as possible by intentional or unintentional terrestrial jammers. In the manner in which it is represented, it is formed of an array of seven radiating elements $1a$, $1b$, $1c$, ..., $1f$, $1g$ arranged on a substantially horizontal earth plane, six $1a$, ..., $1f$ distributed at the vertices of a regular hexagon and a seventh $1g$ placed at the centre of the hexagon. This representation is theoretical since the receive array antenna is in fact embodied on the basis of the patch antenna technique. Other antenna configurations are possible with more or fewer radiating elements arranged at the vertices of a regular polygon and with a central radiating element or otherwise, the antenna preferably having a radiation pattern that is omnidirectional azimuthally since the orientation of the receiver is not necessarily known in advance.

The signals picked up by the radiating elements $1a$, ..., $1g$ of the receive array antenna are applied to identical individual processing chains, only one of which $2d$ is represented in full, catering for the shaping of the signal picked up rendering it suitable for purely digital processing. Customarily, each individual processing chain comprises one or more input stages 20 effecting a limitation of the noise out of band and a drop in frequency of the signal picked up, from the HF range in which it was transmitted (L bands) to an intermediate frequency range FI that is more suitable for digitization, an analogue/digital converter 21 and an output stage 22 completing the frequency drop and ensuring the passage of the useful signal to baseband.

After having been digitized and placed in baseband by the individual processing chains $2a$, ..., $2g$, the signals picked up by the various elements $1a$, ..., $1g$ of the antenna 1, which have the form of strings of digital samples with two components, one I the so-called in-phase component and the other Q the so-called quadrature component, are applied to an antigarbling spatial filter 3.

The antigarbling spatial filter 3 carries out a linear combination of the signals picked up by the various radiating elements of the antenna so as to create a reception pathway favouring the useful signals to the detriment of the jamming signals. Its principle of operation relies on the assumption that the useful signals and the jamming signals are not picked up in the same directions. It consists in creating, in the radiation pattern corresponding to the reception pathway formed at the output of the spatial filter, holes in the directions of the jammers but not in the directions of the useful signals.

The tailoring of the antigarbling spatial filter 3, that is to say the determination of the weighting coefficients of the linear combination of the signals picked up by the receive antenna which it carries out, is done by considering one of the reception pathways applied at the input of the spatial filter 3 as being a master pathway and the others as being auxiliary pathways, by prescribing a unit weighting coefficient for the master pathway and by determining the weighting coefficients of the auxiliary pathways so as to obtain a signal uncorrelated with them at the output of the spatial filter.

In the examples represented, it is assumed that the master reception pathway is that originating from the central element $1g$ of the receive antenna 1 but this master pathway could originate from some other radiating element or even result from a particular combination of the signals picked up by the various radiating elements of the antenna, particular in the sense that it is favourable to the reception of the useful signals. The auxiliary reception pathways originate here from each of the peripheral radiating elements $1a$, ..., $1f$ of the receive antenna 1 but they could also result from particular combinations of the signals picked up by the various radiating elements of the antenna, particular in the sense that they would be rather more favourable to the reception of jammers. The only limitation is that the master and auxiliary reception pathways be independent, that is to say that none of them should reduce to a simple linear combination of the others.

This antigarbling technique will not be detailed further since it is well known, in the field of radar by the name of antijamming by cancellation of side lobes or CSLC antijamming. One of the problems that it poses is that it uses methods for determining the coefficients of the antigarbling spatial filter which, within the framework of broadband useful signals such as are spread band signals, are very sensitive to the disparities of the transfer functions of the various individual processing chains providing the signals of the main and auxiliary reception pathways. This leads to the imposition, during the design of the independent processing chains, of severe constraints for equalizing the performance between all the chains to be complied with in the duration, thereby significantly raising the cost.

To remedy the problem posed by the disparities of the transfer functions of the individual processing chains and thus succeed either in improving the performance of the antigarbling, or in obtaining one and the same level of antigarbling with individual processing chains of lower cost, a bank of automatic equalization circuits that is coupled to a test signal generator 5 and to a gang 6 of switches making it possible, on command, to replace, at the input of the various individual processing chains $2a$, ..., $2g$, the signals picked up by the radiating elements $1a$, ..., $1g$ of the receive antenna 1, with a test signal occupying the same high-frequency band, available on an HF output of the test signal generator 5, is interposed at the output of the individual processing chains $2a$, ..., $2f$, in front of the inputs of the antigarbling spatial filter 3.

The bank of automatic equalization circuits incorporates an automatic equalization circuit per reception pathway. Only the one $4d$ dedicated to the reception pathway corresponding to the signal picked up by the radiating element $1d$ of the receive antenna 1 is visible in FIG. 1. Each automatic equalization circuit $4d$ comprises an adjustable equalization filter $40d$ interposed at the output of the processing chain $2d$ of the reception pathway to which it is dedicated, upstream of the antigarbling spatial filter 3, a circuit $41d$ for determining the coefficients of the adjustable equalization filter $40d$, two spectrum analyser circuits $42t$ and $43d$, one $42t$ connected at input, to an output FI, at intermediate frequency, of the test signal generator 5, the other $43d$ connected at the output of the analogue/digital converter $21d$ of the pathway $1d$ assigned to the automatic equalization circuit considered $4d$, and a subtractor $44d$ connected at the output of the two spectrum analyser circuits 42t and 43d providing the difference noted between the two spectra to the circuit 41d for determining the coefficients of the equalization filter 40d.

The gang 6 of switches makes it possible to isolate at will the individual processing chains from the influence of the outside world and hence the jammers so as to feed them with only the test signal.

The test signal generator 5 produces locally, on an HF output in the high-frequency transmission band of the useful signal picked up by the receiver, and on an FI output in the intermediate frequency band occupied by the output signal from the analogue/digital converters 21a to 21g of the individual processing chains 2a to 2g, two versions of one and the same spread band test signal with the same spectral width as the useful signal and with powers matched to the input sensitivities of the individual processing chains 2a, . . . , 2g and of the equalization circuits 4d. It can implement a carrier dual-phase modulated by a pseudorandom binary string.

The test signal, once injected by way of the gang 6 of switches, into the input of the individual processing chains 2a, . . . , 2g in place of the signals received consisting of the useful signals and of jamming signals picked up by the radiating elements of the receive antenna 1, passes through the various stages of the individual processing chains, which stages are placed upstream of their analogue/digital converters. It thus traverses all their analogue parts and undergoes, on account of the individual processing chains 2a, . . . , 2g, the same disturbances as the useful signals picked up by the receive antenna.

The spectrum analyser circuits 42t, 43d deliver the complex frequency spectra of the signals applied to their inputs. They may operate according to all the known techniques of spectral analysis, including those using the Fourier transformation in all it variants, and also the so-called "high-resolution" techniques using an approach employing the eigenvalues and eigenvectors of the autocorrelation matrix of the signal or an approach employing autoregressive modelling. In FIG. 1, the spectrum analyser circuits 42t, 43d are assumed to carry out an FFT, that is to say a fast Fourier transformation.

One, the spectrum analyser circuit 42t delivers the complex frequency spectrum of the version of the test signal which occupies the intermediate output frequency band of the processing chain while issuing directly, in digital form, from the output FI of the generator of the test signal 5 whereas the other 43d delivers the complex frequency spectrum of the test signal after it has passed through the processing chain 2d so it is impaired by disturbances due to this processing chain 2d. The complex frequency spectrum delivered by the spectrum analyser circuit 42t constitutes a reference transfer function model making it possible to take account of the imperfections of the test signal with respect to the flat spectrum sought in the useful band while the complex frequency spectrum delivered by the spectrum analyser 43d constitutes a measure of the transfer function of the processing chain 2d to within the imperfections of the test signal.

The subtractor 44d subtracts the measured transfer function delivered by the spectrum analyser 43d from the transfer function model delivered by the spectrum analyser circuit 42t so as to reveal the spectral disturbances that are to be corrected by the adjustable equalization filter 40d placed at the output of the individual processing chain 2d.

The circuit 41d for determining the coefficients of the equalization filter performs the conventional calculations for determining the coefficients of a filter so as to effect the transfer function delivered by the subtractor 44d. It may be of any known type and operate, for example, by inverting the autocorrelation matrix of the spectral disturbances.

The adjustable equalization filter 40d is a programmable digital filter being situated, as it is, following an individual processing chain 2d, at a level where the signals are available in digital form. It is advantageously a finite response filter of FIR type.

For convenience, the spectrum analyser 42t operating directly on the signal of the test signal generator 5 has been represented as belonging to each automatic equalization circuit 4a, 4b, . . . , 4g. It goes without saying that it may exist as just a one-off and be pooled in common with all the automatic equalization circuits.

According to a variant, instead of producing a pseudorandom binary string, the test signal generator 5 may produce a pure frequency line of calibrated amplitude which scans the band occupied by the useful signals at the inputs of the individual processing chains 2a, . . . , 2g. The spectrum analyser circuits 42t, 43d then provide complex spectra consisting of the string of complex samples (amplitude/phase) of the signals tapped off at the level of the outputs of the analogue/digital converters of the individual processing chains for various frequency values scanned by the frequency line of the test signal.

Figure 2:
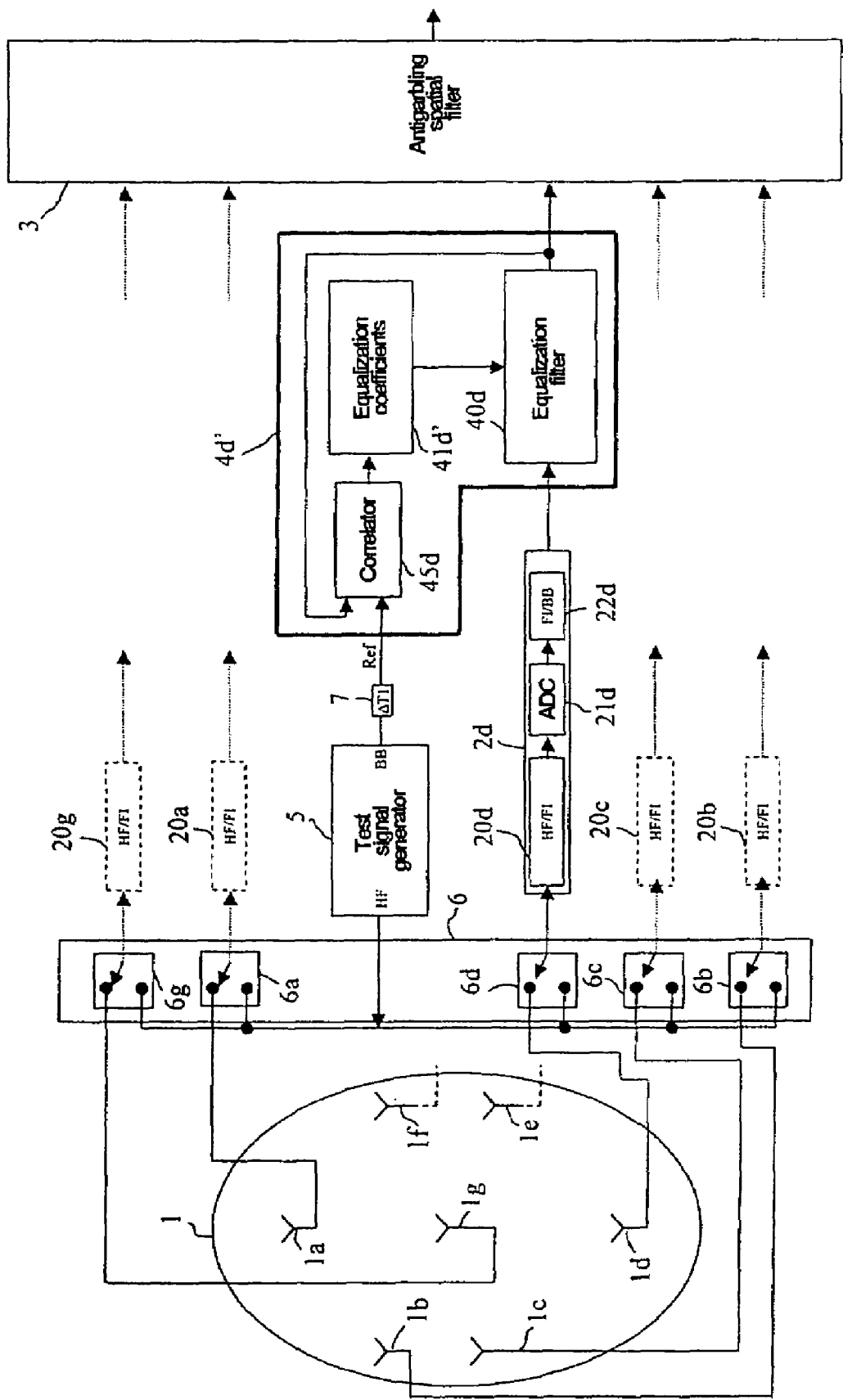

FIG. 2 shows a second exemplary device for antigarbling by spatial filtering provided with a bank of automatic equalization circuits. The difference relative to the antigarbling device described in relation to FIG. 1 lies essentially at the level of the design of the automatic equalization circuits 4d' and more particularly of the mode of tailoring the adjustable equalization filter 40d which is no longer done on the basis of an explicit measurement of the differences exhibited by the transfer function of the processing chain with respect to a reference transfer function but according to an adaptive method that tends to maximize the value of the correlation existing between the test signal at the output of the adjustable equalization filter 40d and its version originating directly from the test signal generator 5, this version now being taken on an output BB where the test signal is available in digital form, in baseband rather than in intermediate frequency band, a delay circuit 7 making it possible to correct the delay ΔT1 taken by the test signal emanating from the processing chain on account of its longer journey and to put the two correlated versions of the test signal back into phase.

Thus, in place of the spectrum analysers 42t, 43d and of the subtractor 44d, there is a simple correlator 45d, one input of which is connected at the output of the adjustable equalization filter 40d and the other input of which is connected following the delay circuit 7 placed on the output BB of the test signal generator 5. The circuit for determining the coefficients of the adjustable equalization filter 41d' operates by successive approximations, implementing the conventional techniques based on the gradient algorithm that are used, for example, in the field of modems to carry out matched filtering of the transmission links.

Figure 3:
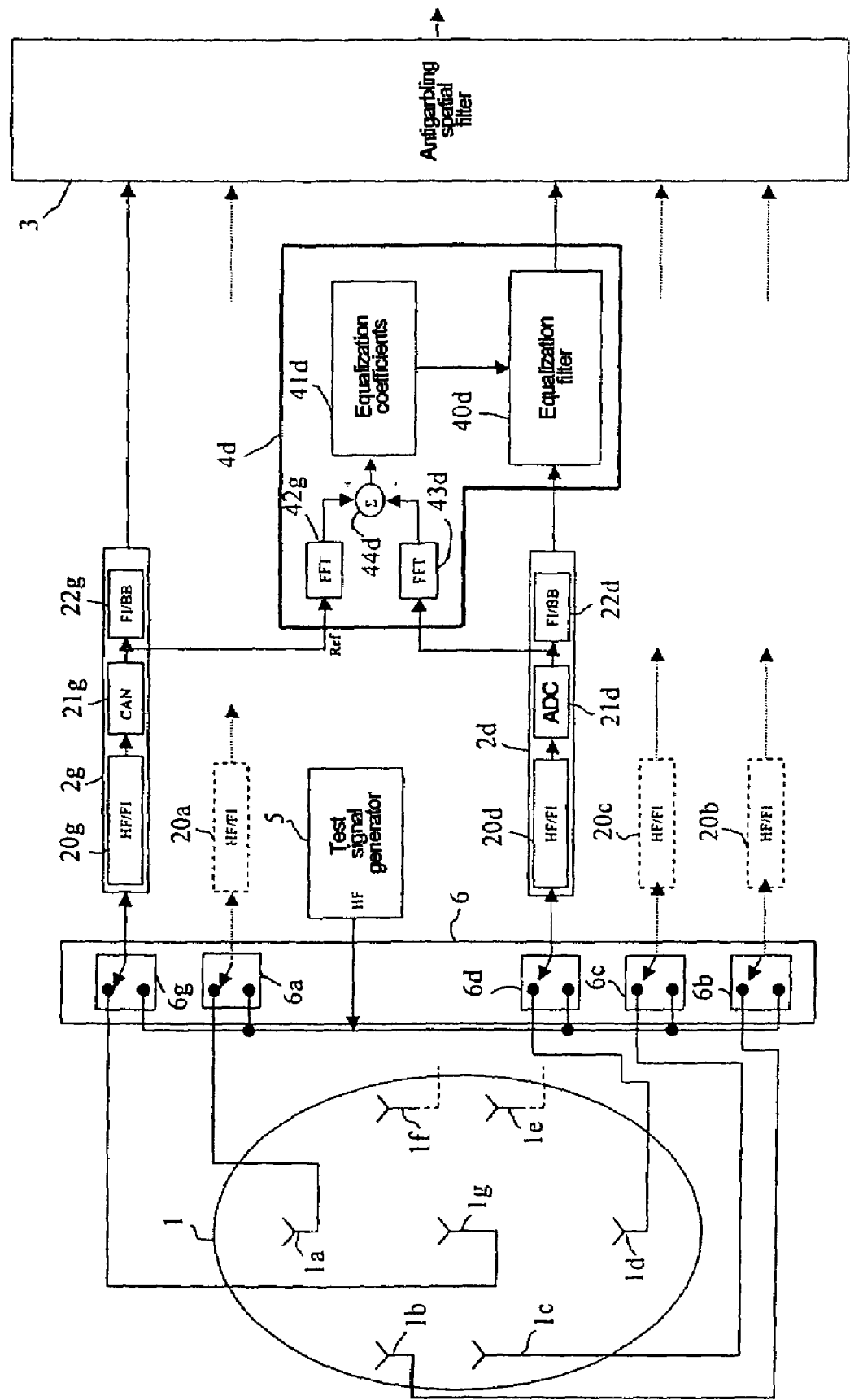

FIG. 3 shows a third exemplary device for antigarbling by spatial filtering provided with a bank of automatic equalization circuits. The difference with respect to the antigarbling device described in relation to FIG. 1 lies at the level of the test signal version used for the transfer function model. This version, instead of originating directly from the test signal generator 5 is extracted from the individual processing chain 2g assigned to the reception pathway originating from the central radiating element 1g of the antenna 1 taken as master pathway for the antigarbling spatial filter 3. In this case, the individual processing chain 2g of the master pathway is taken as reference and comprises no automatic equalization circuit unlike all the other individual processing chains 2a to 2f. It is pointed out that the two versions of the test signal that are used by an automatic equalization circuit $4d$ are extracted at one and the same level of the two individual processing chains, either, as represented, at the intermediate output of the analogue/digital conversion stage, or even at the final output, after the stage $22g$, $22d$ for translating the signal to baseband, but upstream of the adjustable equalization filter $40d$.

Figure 4:
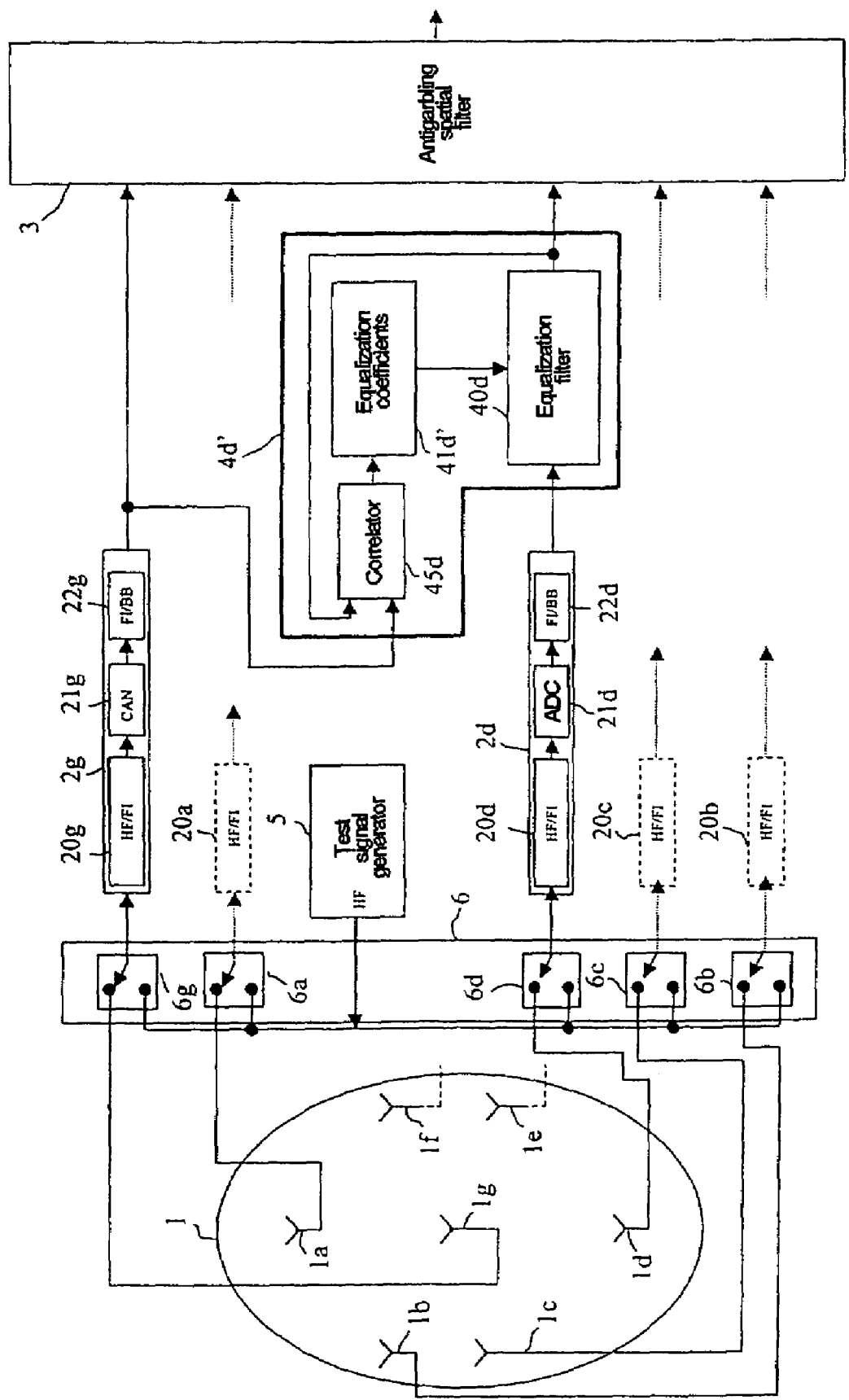

FIG. 4 shows a fourth exemplary device for antigarbling by spatial filtering provided with a bank of automatic equalization circuits. It is distinguished from the previous one by the construction of the automatic equalization circuits $4d'$ which borrows from that with correlator $45d$ of the second example illustrated in FIG. 2. As one of the inputs of the correlator $45d$ must be connected at the output of the adjustable equalization filter $40d$ delivering a baseband signal, the other input of the correlator $45d$ can now be connected only at the level of the final output of the individual processing chain $2g$ although the signal is also in baseband.

In the examples of devices for antigarbling by spatial filtering provided with a bank of automatic equalization circuits which have just been described in relation to FIGS. 1 to 4, the banks of automatic equalization circuits are adjusted in the course of calibration operations where the test signal is substituted with the signals of the receive antenna 1 by throwing a bank of switches 6. These calibration operations may be done simultaneously for all the processing chains, for example when the receiver is turned on or sequentially after a certain period of time taking account of the drifting of the processing chains. By assigning different calibration periods for the processing chains it is possible to let the spatial filtering continue during the calibration periods, only the processing chain under test being provisionally discarded.

The insertion of calibration periods in the course of the operation of the GPS receiver is advantageously entrusted to an automaton which either regularly prescribes calibration periods when the receiver is turned on and after periods of operation of a specified duration chosen as a function of the rates of drifting of the characteristics of the individual processing chains, or initializes a calibration period when the receiver is turned on and whenever the signal-to-noise ratio of the signal received, measured downstream in the receiver after the despreading operation becomes less than a threshold regarded as the tolerable minimum for reliable operation of the GPS receiver.

It is also possible for antigarbling devices with spatial filtering to be provided with a bank of automatic equalization circuits that adjust themselves continuously, in the background of the reception of the useful signal.

Figure 5:
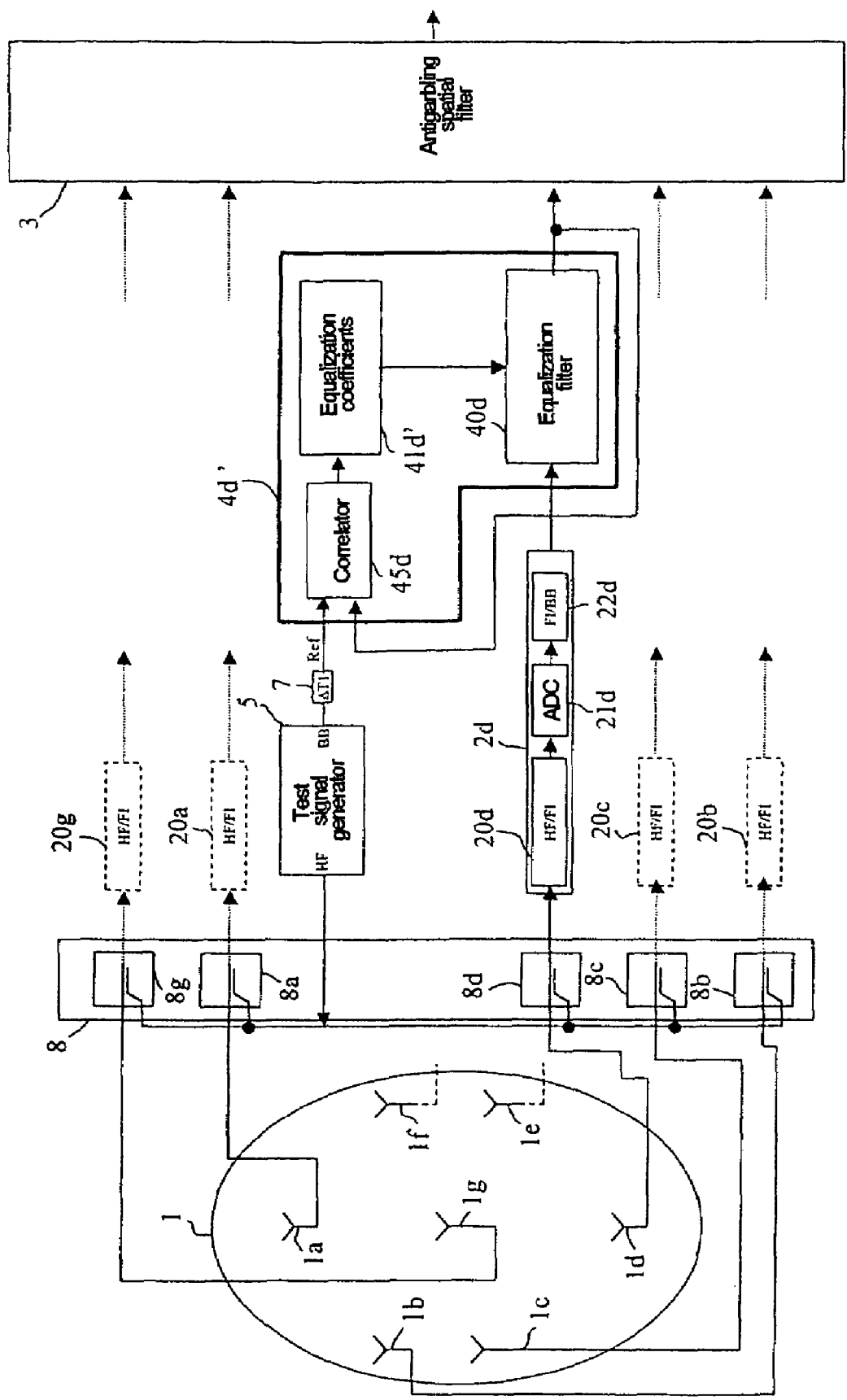

FIG. 5 gives an example thereof derived from that of FIG. 2. This fifth example is much like that of FIG. 2 from which it borrows the design of the automatic equalization circuits $4d'$. It is distinguished therefrom only by the fact that the bank 6 of switches $6a$ to $6g$ has given way to a bank 8 of couplers $8a$ to $8g$. The test signal produced at high frequency by the test generator 5 is superimposed on the reception signals of the antenna 1 in the various individual processing chains $2a$ to $2g$. At the level of an automatic equalization circuit $4d'$, the useful reception signal superimposed on the test signal at the output of the adjustable equalization filter $40d$ plays the role of noise in the correlation performed by the correlator $45d$, with the version of the test signal originating directly from the test signal generator 5, which noise is eliminated or, at the very least, greatly weakened if one has taken the precaution of taking for the test signal a pseudorandom binary code orthogonal to the pseudorandom binary codes used by the GPS system.

Figure 6:
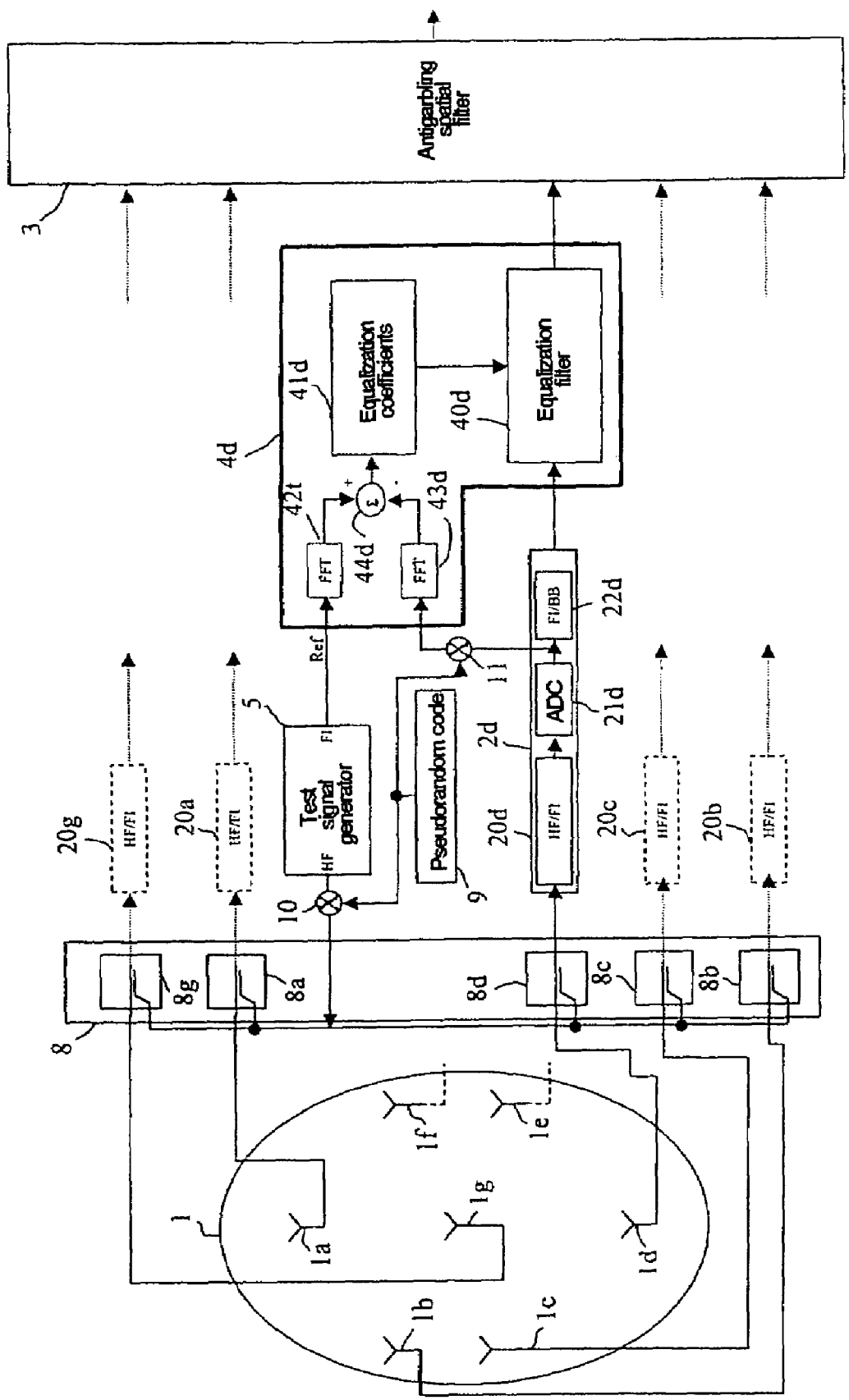

FIG. 6 shows a sixth exemplary device for antigarbling with spatial filtering together with a bank of automatic equalization circuits that continually adjust themselves, in the background of the reception of the useful signal. This other example is much like that of FIG. 1 from which it borrows the design of the automatic equalization circuits $4d$. It is distinguished therefrom nevertheless, by various characteristics. As in the previous example of FIG. 5, the bank 6 of switches $4a$ to $4g$ has given way to a bank 8 of couplers $8a$ to $8g$ but additionally, the test signal available on the HF output of the test signal generator 5 undergoes auxiliary modulation by a pseudorandom code before being superimposed on the useful reception signal at the input of the individual processing chains $2a$ to $2g$ followed by auxiliary demodulation at the output of the individual processing chains $2a$ to $2g$ before being applied to the spectrum analyser $43d$.

The auxiliary modulation and demodulation of the test signal before and after its passage through the individual processing chain to be equalized are aimed at making it possible to attenuate the useful signal at the input of the spectrum analyser $43d$ so that the latter sees mainly the test signal. They are carried out by means of a local pseudorandom binary code generator 9, of a modulator 10 interposed between the HF output of the test signal generator 5 and the bank 8 of couplers $8a$ to $8g$ and of a demodulator 11 interposed in front of the input of the spectrum analyser $43d$ of the automatic equalization circuit. The auxiliary modulation is preferably done at a multiple of the bit rate of the test signal and carries out an additional band spreading which is chosen so as to adapt to the band width margin on either side of that of the useful signal, adopted for the individual processing chains during their design.

Figure 7:
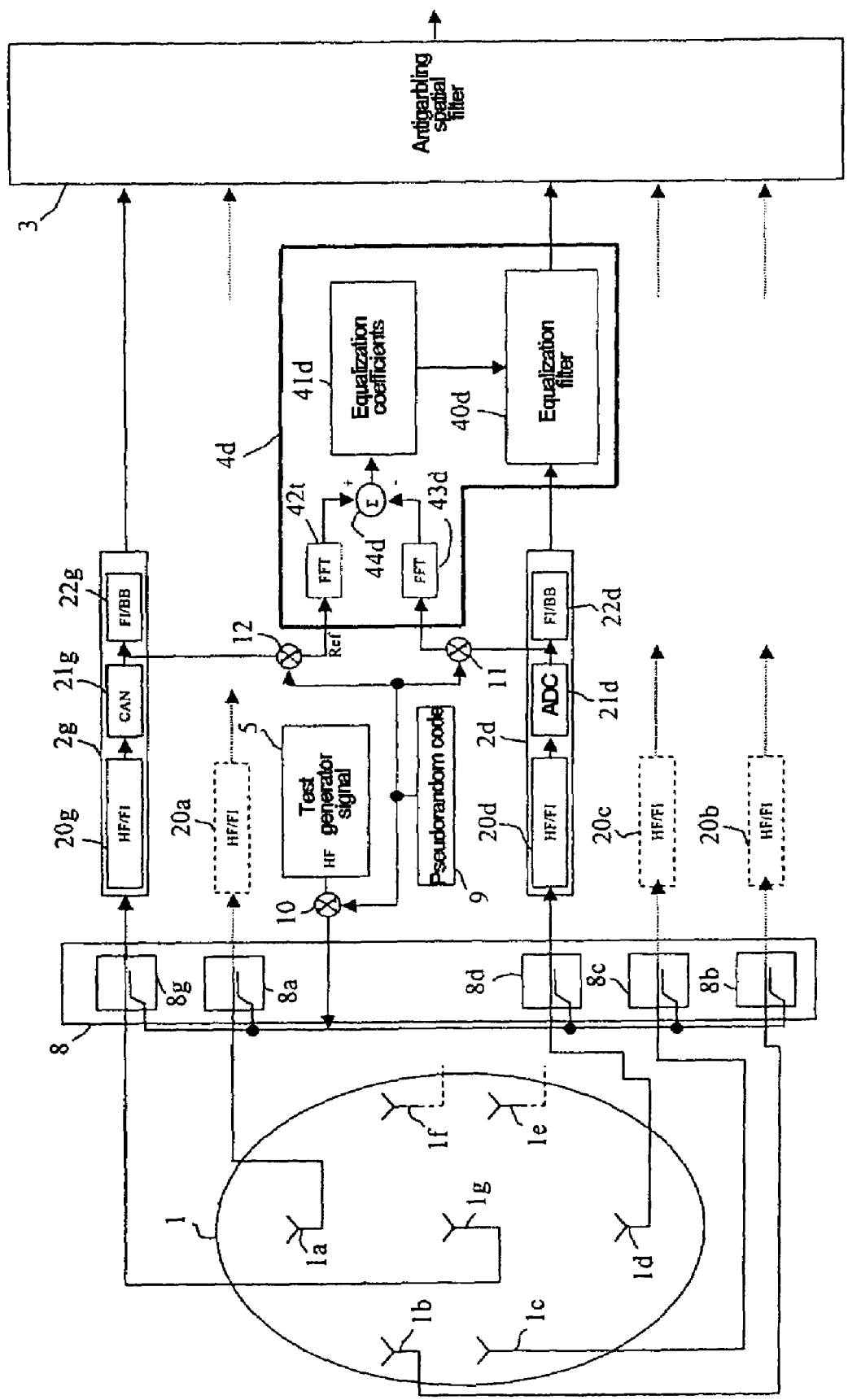

FIG. 7 shows a seventh exemplary device for antigarbling by spatial filtering provided with a bank of automatic equalization circuits. The difference relative to the antigarbling device described in relation to FIG. 6 above lies at the level of the test signal version used for the transfer function model. This version, instead of originating directly from the test signal generator 5 is extracted from the individual processing chain $2g$ assigned to the reception pathway originating from the central radiating element $1g$ of the antenna 1 taken as master pathway for the antigarbling spatial filter 3.

Like the signal extracted from the individual processing chain $2d$ forming the subject of the equalization, the signal extracted from the individual processing chain $2g$ taken as reference undergoes demodulation at 12 intended to pick out the test signal from the whole set of components of the output signal from this individual processing chain $2g$. It is pointed out that, as previously with regard to the example illustrated in FIG. 3, the individual processing chain $2g$ of the master pathway taken as reference comprises no automatic equalization circuit unlike all the other individual processing chains $2a$ to $2f$ and that the two versions of the test signal that are used by an automatic equalization circuit $4d$ are extracted at one and the same level of the two individual processing chains, either, as represented, at the intermediate output of the analogue/digital conversion stage, or even at the final output, after the stage $22g$, $22d$ for translating the signal to baseband, but upstream of the adjustable equalization filter $40d$.

Figure 8:
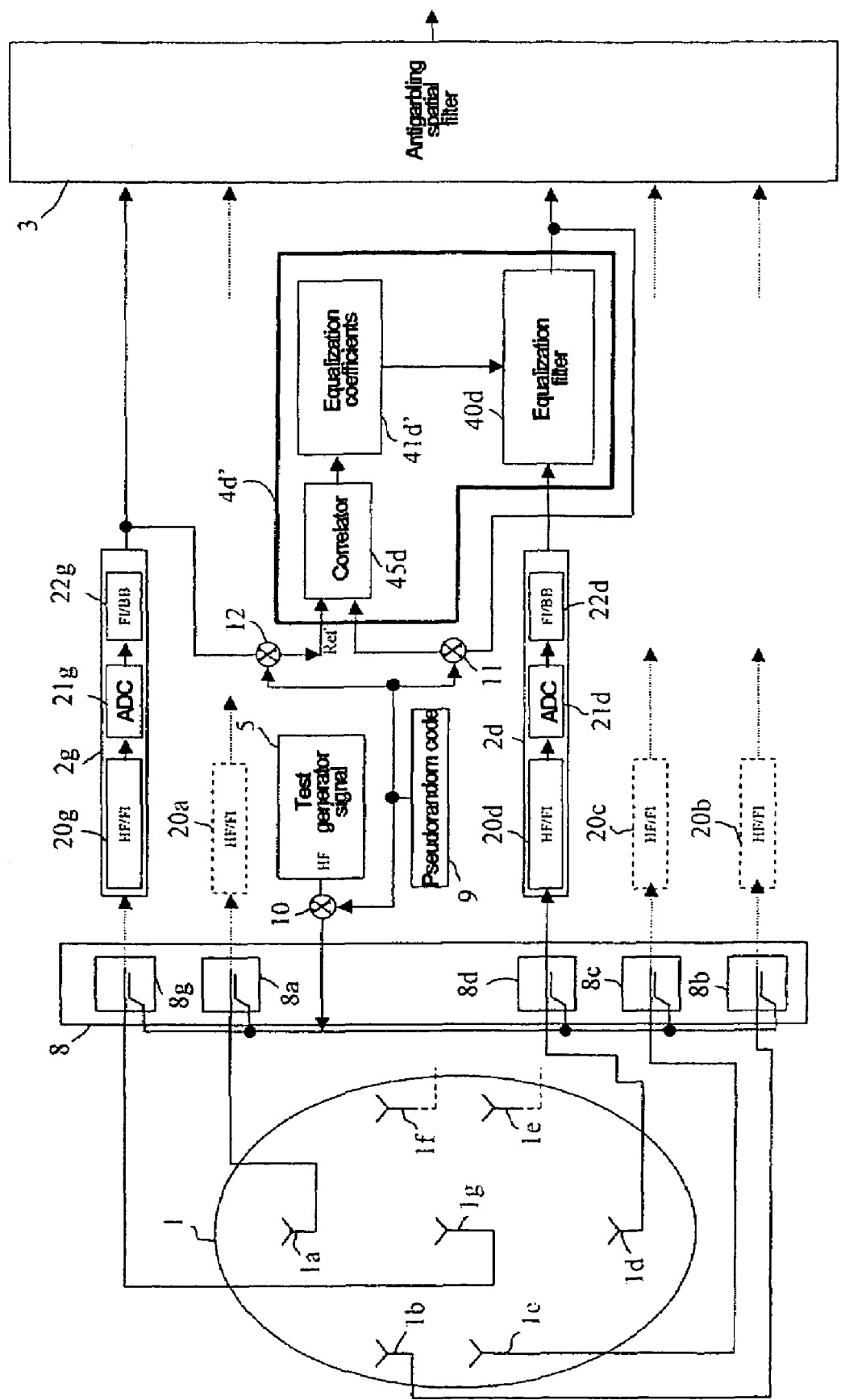

FIG. 8 shows an eighth exemplary device for antigarbling by spatial filtering provided with a bank of automatic equalization circuits. It is distinguished from the previous one illustrated in FIG. 7 by the construction of the automatic equalization circuits $4d'$ which borrows from that with correlator $45d$ of the examples illustrated in FIGS. 2, 4 and 5. As one of the inputs of the correlator $45d$ must be connected at the output of the adjustable equalization filter $40d$ delivering a baseband signal, the other input of the correlator $45d$ can now be connected only at the level of the final output of the individual processing chain 2g although the signal is also in baseband.

Other variants of devices for antigarbling by spatial filtering with a bank of automatic equalization circuits are also possible, in particular variants combining the bank of switches and the bank of couplers of the examples described above. It is also possible to take into account the part of the inhomogeneity defects, in the processings of the reception pathways, that are due to the radiating elements of the receive antenna. To do this, it is sufficient to replace the banks of switches or of couplers by a transmit antenna excited by the local test signal generator and arranged on the same carrier as the receive antenna, in proximity to or even within the receive antenna.

Figure 9:
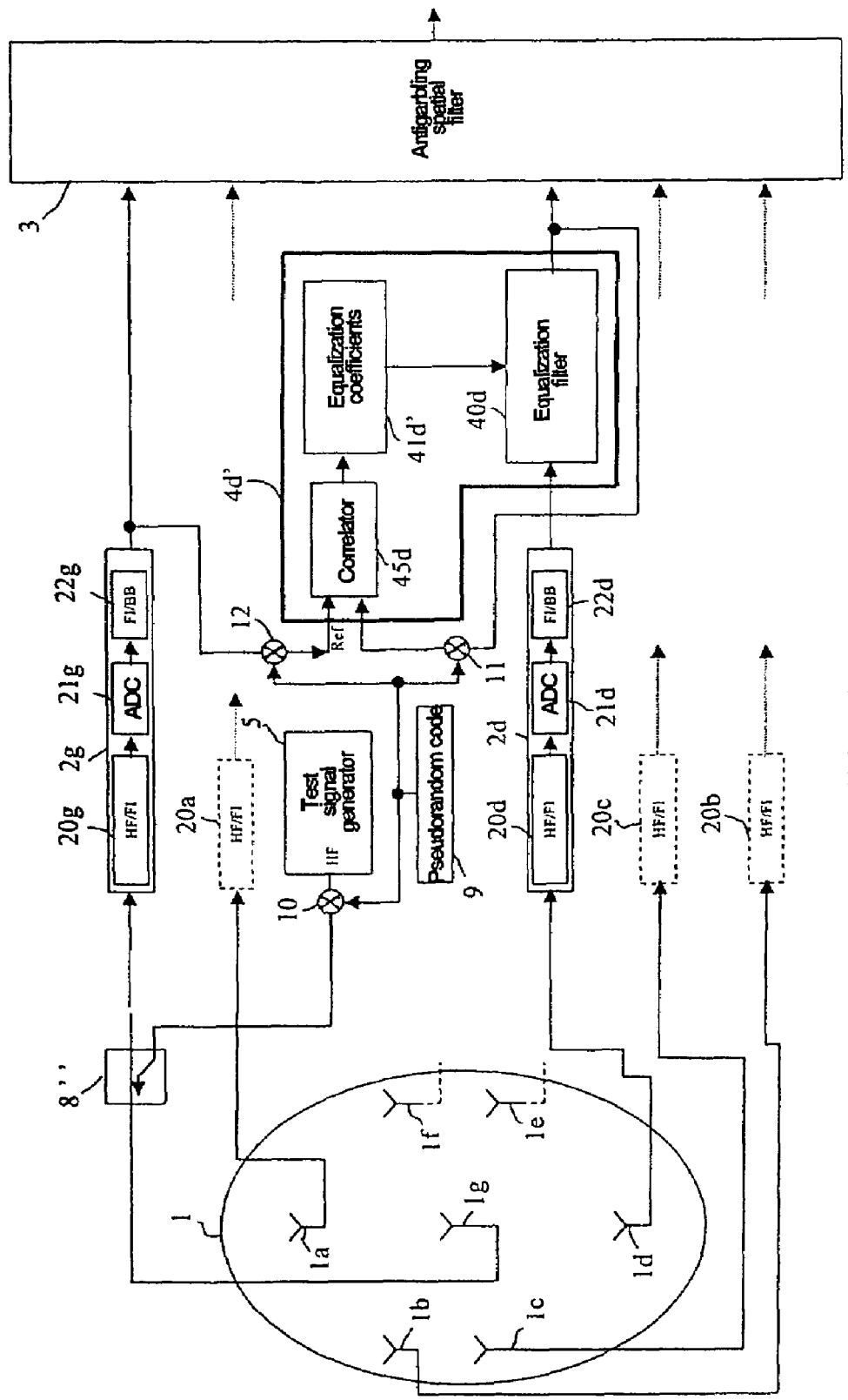

As shown by the ninth exemplary device for antigarbling by spatial filtering illustrated in FIG. 9, one of the radiating elements of the receive antenna, here the element 1g, may be used as transmit antenna for the test signal. This radiating element 1g which retains its role on reception, is excited on transmission, by means of an auxiliary coupler 8" by the test signal previously subjected to auxiliary modulation in order to allow its separation from the useful signal during its reception.

It is pointed out that, in the various devices described, the banks 4, 4' of automatic equalization circuits intervene on the signals although they have been digitized. They are therefore implemented by digital processing like the antigarbling spatial filter 3 so that the two functions of equalization by temporal filtering and of antigarbling by spatial filtering may be conducted by means of one and the same circuit specialized in signal processing such as a DSP (Digital Signal Processor).

The devices just described have the benefit of allowing the correction of defects in the frequency-dropping analogue chains for the reception pathways of an array antenna by programming digital hardware components which is a much easier operation than intervening in the design of the analogue stages. It is thus possible to circumvent the often very formidable specifications imposed on the HF stages in the field of arrays of sensors of radio signals such as radionavigation signals.

The corrections performed digitally rely on easily modifiable calculation algorithms that are obviously less subject to technological limitations than those encountered in HF.

Finally, from the cost point of view, this tradeoff in complexity from analogue to digital makes it possible, for identical performance, to substantially reduce the development costs of the products and leaves the way open to the possibilities of optimization by simple updating of software even in low-cost applications.

The invention claimed is:

1. A method for processing a radio signal, comprising:
   receiving a signal by a set of processing chains;
   equalizing an output of at least one processing chain using an adjustable temporal equalization filter, based upon differences between a test signal processed by the processing chain and a reference version of the test signal; and
   spatial filtering the equalized radio signal processed by each processing chain.

2. The method according to claim 1, wherein the test signal processed by the at least one processing chain has appreciably greater power than the received radio signal.

3. The method according to claim 1, wherein the test signal processed by the at least one processing chain is distinguished from the received signal by an auxiliary modulation.

4. The method according to claim 3, further comprising modulating the test signal by means of a pseudorandom binary string.

5. The method according to claim 1, further comprising:
   measuring a transfer function of the processing chain to be equalized using the test signal;
   comparing the measured transfer function with a reference transfer function derived from the reference version of the test signal;
   calculating coefficient values of the adjustable equalization filter based upon differences between the measured transfer function and the reference transfer function; and
   tailoring the equalization filter with the coefficient values to attenuate the measured differences.

6. The method according to claim 5, wherein calculating the coefficients further comprises:
   maximizing a value of correlation between the test signal and the reference version of the test signal in an autoadaptive manner.

7. The method according to claim 1, further comprising generating the test signal and the reference version of the test signal, the test signal in an input frequency band of the processing chains, and the reference version of the test signal in an output frequency band of the processing chains to be equalized.

8. The method according to claim 1, further comprising transmitting the reference version of the test signal through a main processing chain which is devoid of any adjustable temporal equalization filter or any equalization filter tailoring circuit.

9. The method according to claim 1, further comprising filtering the signal received from each processing chain by the adjustable temporal equalization filter and using an equalization filter tailoring circuit.

10. The method according to claim 9, wherein the reference version of the test signal is equal to a weighted linear combination of the test signal transmitted by the processing chains and tapped off upstream of the adjustable temporal equalization filter.

11. The method according to claim 1, further comprising tailoring the adjustable temporal equalization filter using an equalization filter tailoring circuit during calibration periods when the received signal is replaced, at the input of the processing chain concerned, by the test signal.

12. The method according to claim 11, further comprising reserving time slots for the calibration periods, the calibration being performed simultaneously for all processing chains, interrupting the spatial filtering during these time slots.

13. The method according to claim 11, further comprising assigning the calibration periods in sequence to each of the processing chains and provisionally disregarding the processing chain under test from spatial filtering.

14. The method according to claim 1, further comprising:
   generating the test signal which is a spread band signal and occupies the same frequency band as the received signal; and
   generating the test signal by modulation of a carrier with a pseudorandom binary string.

15. The method according to claim 1, further comprising generating a pure frequency test signal by scanning the frequency band of the received signal.

16. The method according to claim 1, further comprising:
   switching inputs of the processing chains to either a receive antenna or to at least one local test signal generator; and
   receiving the test signal at the inputs of the processing chains.

17. The method according to claim 1, further comprising adding the test signal to signals received from radiating elements of an antenna array by means of coupling devices and receiving the added test signal at the inputs of the processing chains.

18. The method according to claim 1, further comprising transmitting the test signal to processing chains by a transmit antenna mounted on a same carrier as the receive antenna.

19. A device for processing a radio signal, comprising:
a set of parallel processing chains having identical transfer functions, each parallel processing chain having an input and an output;
a spatial filter performing a weighted linear combination of the output of the parallel processing chains;
a test signal generator for generating a test signal;
at least one circuit for injecting the test signal provided by the test signal generator into each input of the parallel processing chains; and
a bank of automatic equalization circuits, each equalization circuit arranged at the output of each parallel processing chain.

20. The device according to claim 19, wherein each automatic equalization circuit comprises:
a first spectral analysis circuit configured to analyze a spectrum of the test signal processed by each processing chain;
a second spectral analysis circuit configured to analyze a spectrum of a reference version of the test signal;
a subtractor circuit having an output based upon subtracting the spectrum measured by the first spectral analysis circuit from spectrum measured by the second spectral analysis circuit;
an adjustable temporal equalization filter interposed between the output of the processing chain and the spatial filter; and
a circuit for determining coefficients of the adjustable temporal equalization filter based upon the output of the subtractor circuit.

21. The device according to claim 20, wherein the test signal generator generates a first version of the test signal in a frequency band of the input to the processing chains and generates the reference version of the test signal in a frequency band of the output of the processing chains.

22. The device according to claim 20, further comprising a main processing chain, which is one of the parallel processing chains and the does not comprise any automatic equalization circuit, the main processing chain delivers the reference version of the test signal.

23. The device according to claim 20, further comprising a bank of automatic equalization circuits, each automatic equalization circuit corresponds to one processing chain included the set of parallel processing chains.

24. The device according to claim 23, wherein the reference version of the test signal is based upon a weighted linear combination of the test signals received from the outputs of the processing chains.

25. The device according to claim 20, wherein the automatic equalization circuit further comprises:
an adjustable temporal equalization filter having an output interposed between the output of each processing chain;
a correlator configured to compare the reference version of the test signal with the test signal received from the output of the adjustable temporal equalization filter and outputting a correlation value; and
an equalization filter tailoring circuit configured to maximize the correlation value.

26. The device according to claim 25, wherein the test signal generator generates a first version of the test signal in a frequency band of the inputs to the processing chains and a reference version of the test signal in a frequency band of the output of the adjustable temporal equalization filters.

27. The device according to claim 25, further comprising a main processing chain, which is one of the parallel processing chains and does not comprise any automatic equalization circuit, the main processing chain delivers the reference version of the test signal.

28. The device according to claim 25, further comprising a bank of automatic equalization circuits, each automatic equalization circuit corresponds to one processing chain included in the set of parallel processing chains.

29. The device according to claim 28, wherein the reference version of the test signal is based upon a weighted linear combination of the test signals received from the outputs of the processing chains.

30. The device according to claim 19, comprising a bank of switches, which are configured to switch the input of the processing chains from a signal received from radiating elements to the test signal, during calibration periods.

31. The device according to one of claim 30, further comprising an automaton configured to introduce the calibration periods.

32. The device according to claim 30, wherein the automaton is configured to introduce the calibration periods after a specified duration of operation.

33. The device according to claim 30, wherein the automaton is configured to introduce the calibration period each time signal-to-noise ratio downstream of the spatial filter goes below a predetermined threshold value.

34. The device according to claim 19, comprising a bank of couplers, which are configured to add the test signal to signals received from the radiating elements.

35. The device according to claim 19, wherein the parallel processing chains are configured to connect to radiating elements of a receive antenna, which includes a transmit antenna configured to transmit the test signal.

36. The device according to claim 35, further comprising a directional coupler configured to connect the transmit antenna with a processing chain.

37. The device according to one of claim 35, further comprising an automaton configured to introduce a calibration period.

38. The device according to claim 35, wherein the automaton is configured to introduce a calibration period after a specified duration of operation.

39. The device according to claim 35, wherein the automaton is configured to introduce a calibration period each time signal-to-noise ratio downstream of the spatial filter goes below a predetermined threshold value.

40. The device according to claim 19, wherein the test signal generator is a pseudorandom binary string generator.

41. The device according to claim 19, wherein the test signal generator is configured to generate signal with predetermined frequency band.

42. The device according to claim 19, wherein the device is configured to be integrated with a satellite navigation system receiver.

* * * * *